(12) United States Patent
Savage et al.

(10) Patent No.: US 7,673,561 B1
(45) Date of Patent: Mar. 9, 2010

(54) NUT-CRACKING APPARATUS

(75) Inventors: Basil W. Savage, Madill, OK (US);
Steven W. Savage, Madill, OK (US);
Randal D. Ingle, Mannsville, OK (US)

(73) Assignee: Savaga Equipment Incorporated, Madill, OK (US)

( * ) Notice: Subject to any disclaimer, the term of this patent is extended or adjusted under 35 U.S.C. 154(b) by 729 days.

(21) Appl. No.: 11/025,445

(22) Filed: Dec. 29, 2004

(51) Int. Cl.
*A23N 5/00* (2006.01)
(52) U.S. Cl. .............................. 99/571; 99/574; 99/581
(58) Field of Classification Search .................. 99/571, 99/574, 581, 568, 572, 573, 575, 576, 577, 99/578, 579, 580
See application file for complete search history.

(56) References Cited

U.S. PATENT DOCUMENTS

| | | | | |
|---|---|---|---|---|
| 1,802,294 | A | * | 4/1931 | Walker ........................ 99/576 |
| 2,954,810 | A | * | 10/1960 | MacCloygston Bond ..... 99/574 |
| 3,871,275 | A | | 3/1975 | Quantz |
| 4,332,827 | A | | 6/1982 | Quantz |
| 4,418,617 | A | | 12/1983 | Quantz |
| 4,441,414 | A | | 4/1984 | Quantz |
| 4,688,281 | A | | 8/1987 | Lantz |
| 5,247,879 | A | | 9/1993 | Frederiksen et al. |
| 5,623,867 | A | | 4/1997 | Quantz |
| 5,711,213 | A | * | 1/1998 | Thomson ..................... 99/571 |
| 6,182,562 | B1 | | 2/2001 | Quantz et al. |
| 6,205,915 | B1 | * | 3/2001 | Quantz ........................ 99/571 |
| 6,209,448 | B1 | | 4/2001 | Hagen |
| D442,189 | S | | 5/2001 | Quantz et al. |
| D442,609 | S | | 5/2001 | Quantz et al. |
| 6,270,824 | B1 | | 8/2001 | Quantz |
| 6,584,890 | B1 | | 7/2003 | Quantz et al. |
| 6,588,328 | B1 | | 7/2003 | Quantz et al. |
| 6,766,732 | B1 | | 7/2004 | Quantz et al. |
| 6,772,680 | B1 | | 8/2004 | Quantz et al. |
| 6,851,353 | B1 | | 2/2005 | Quantz et al. |
| D509,517 | S | | 9/2005 | Quantz et al. |
| D519,529 | S | | 4/2006 | Quantz et al. |

\* cited by examiner

*Primary Examiner*—Reginald L Alexander
(74) *Attorney, Agent, or Firm*—McAfee & Taft

(57) ABSTRACT

A nut-cracking apparatus that is compact and efficient cracks nuts at high production rates. The nut-cracking apparatus includes an endless conveyor and delivers nuts from a hopper to a delivery point. The nuts are engaged at the delivery point by a nut-cracking unit which cracks the nuts. The endless conveyor includes nut pockets which are made up of separate nut pocket segments that are movable from open to closed positions. The nut pocket segments are in an open position where the nuts are cracked to provide ample room for cracking of the nut.

29 Claims, 16 Drawing Sheets

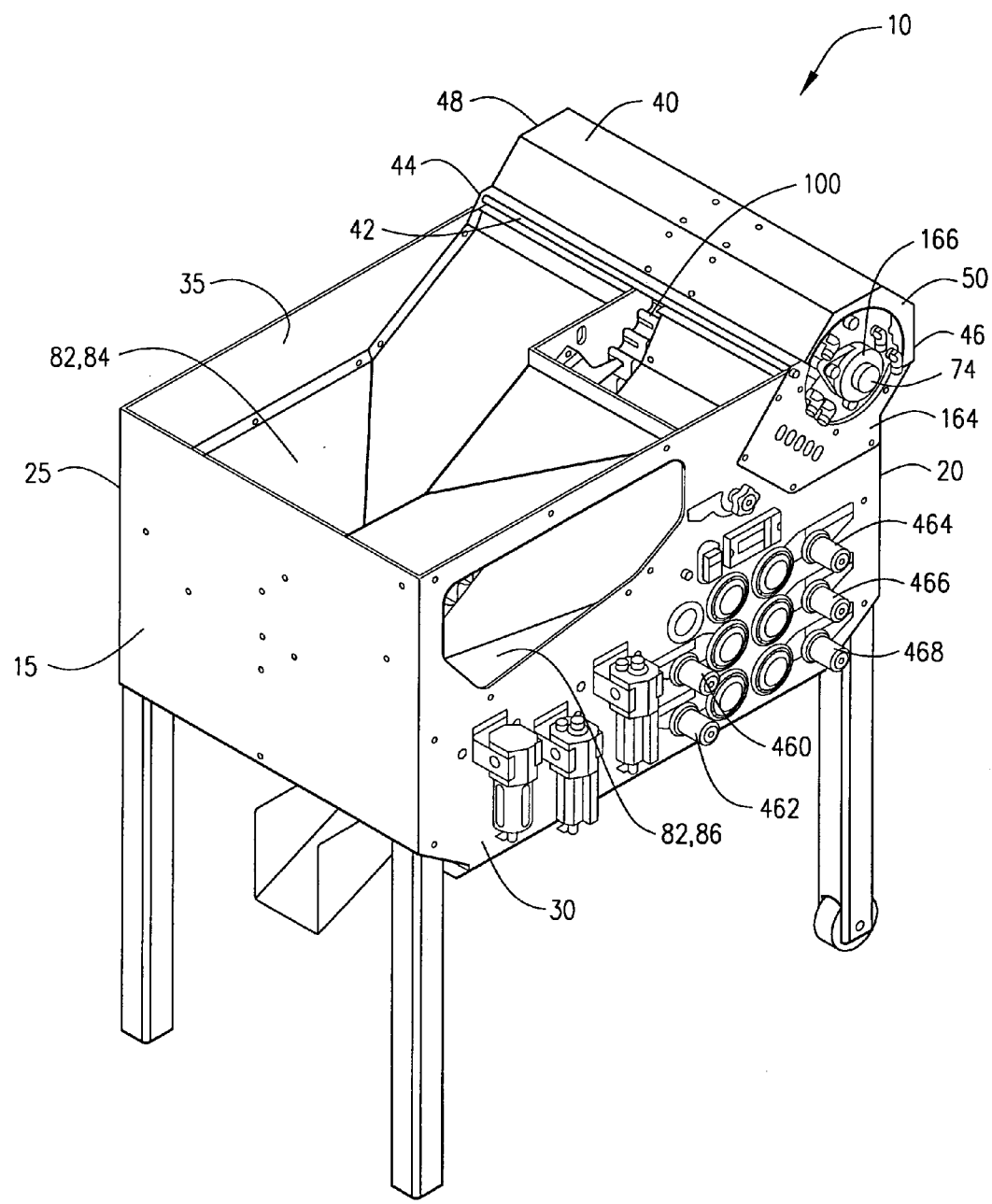
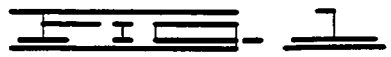

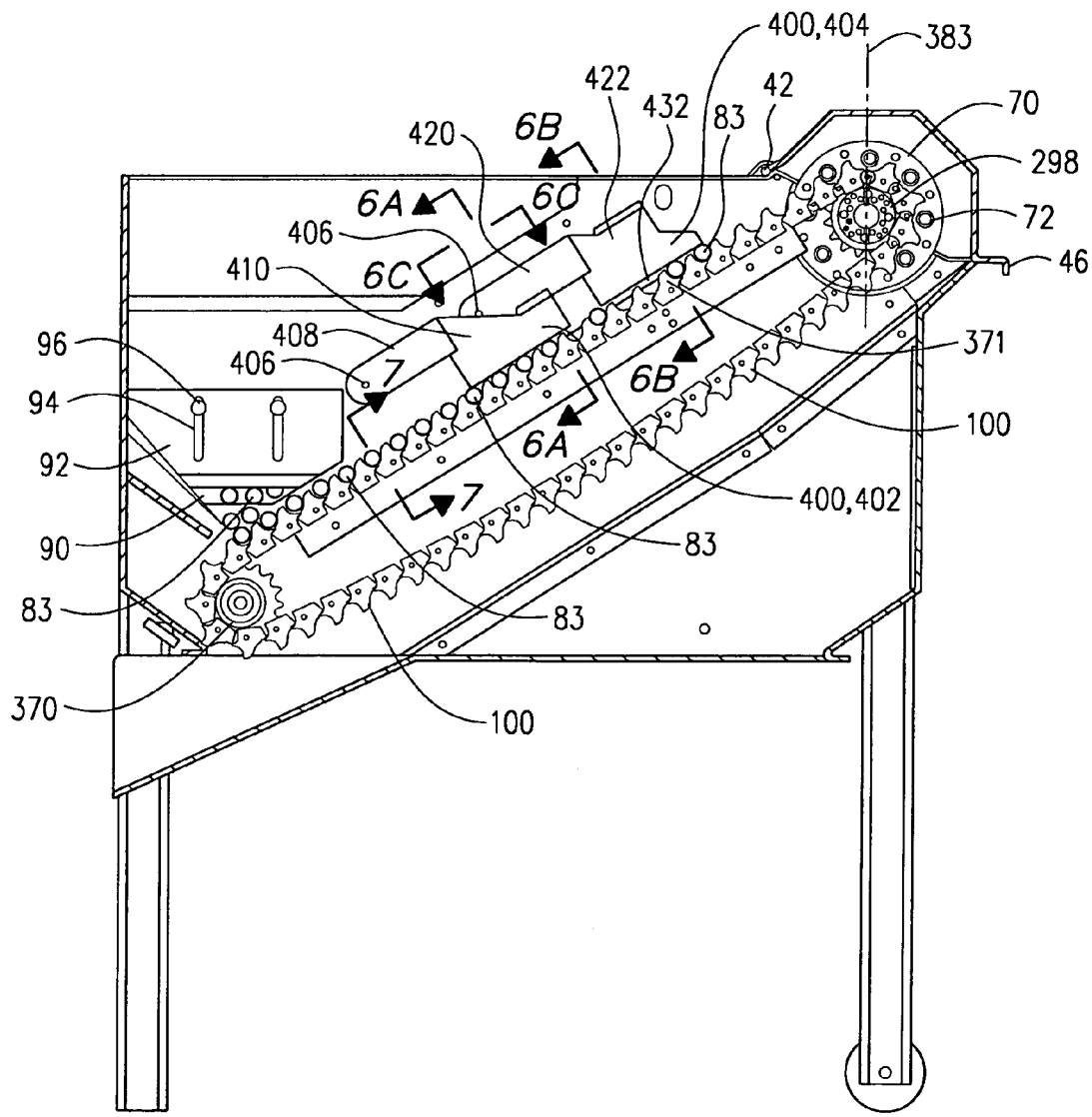
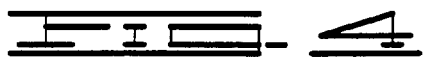

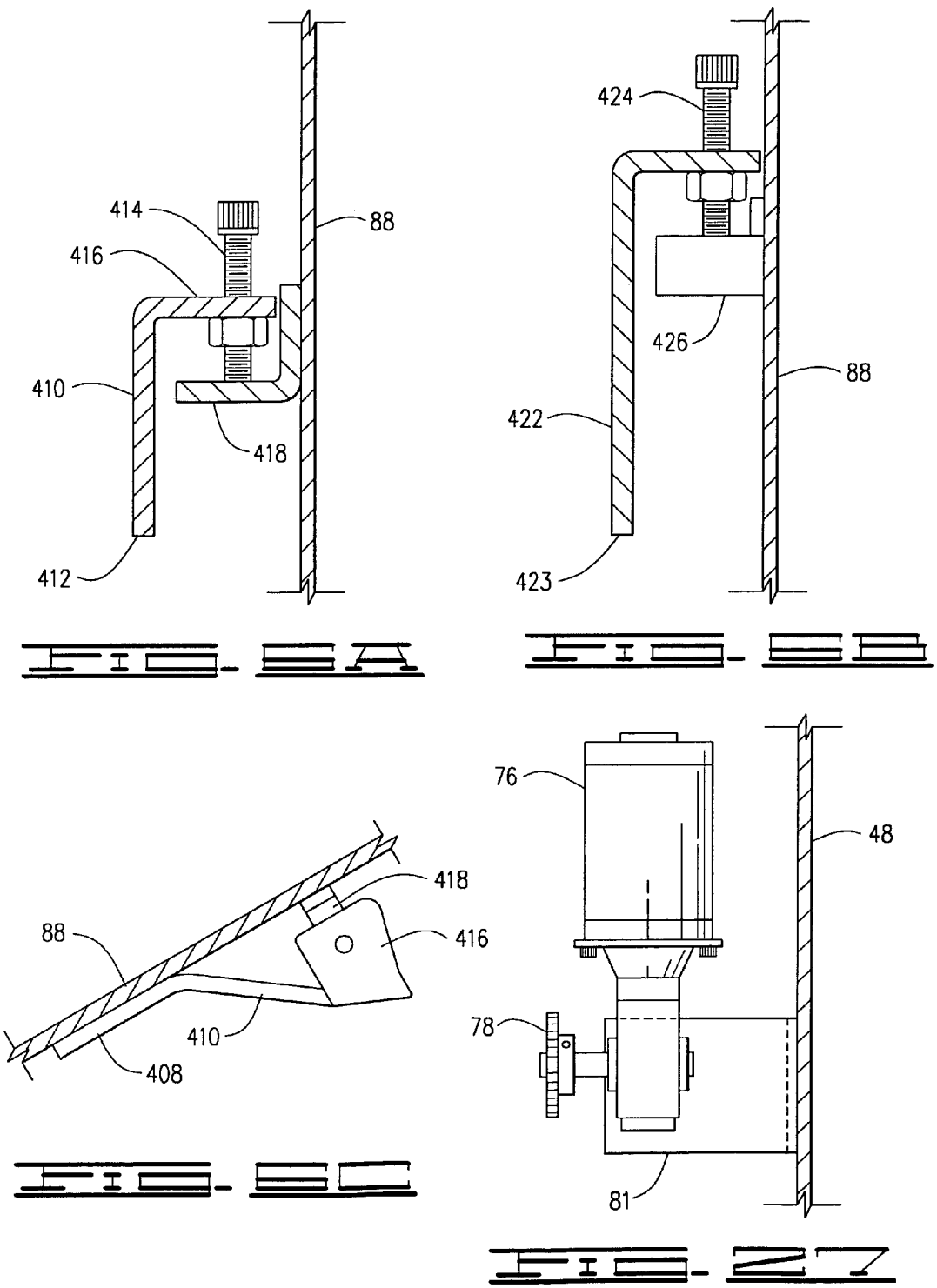

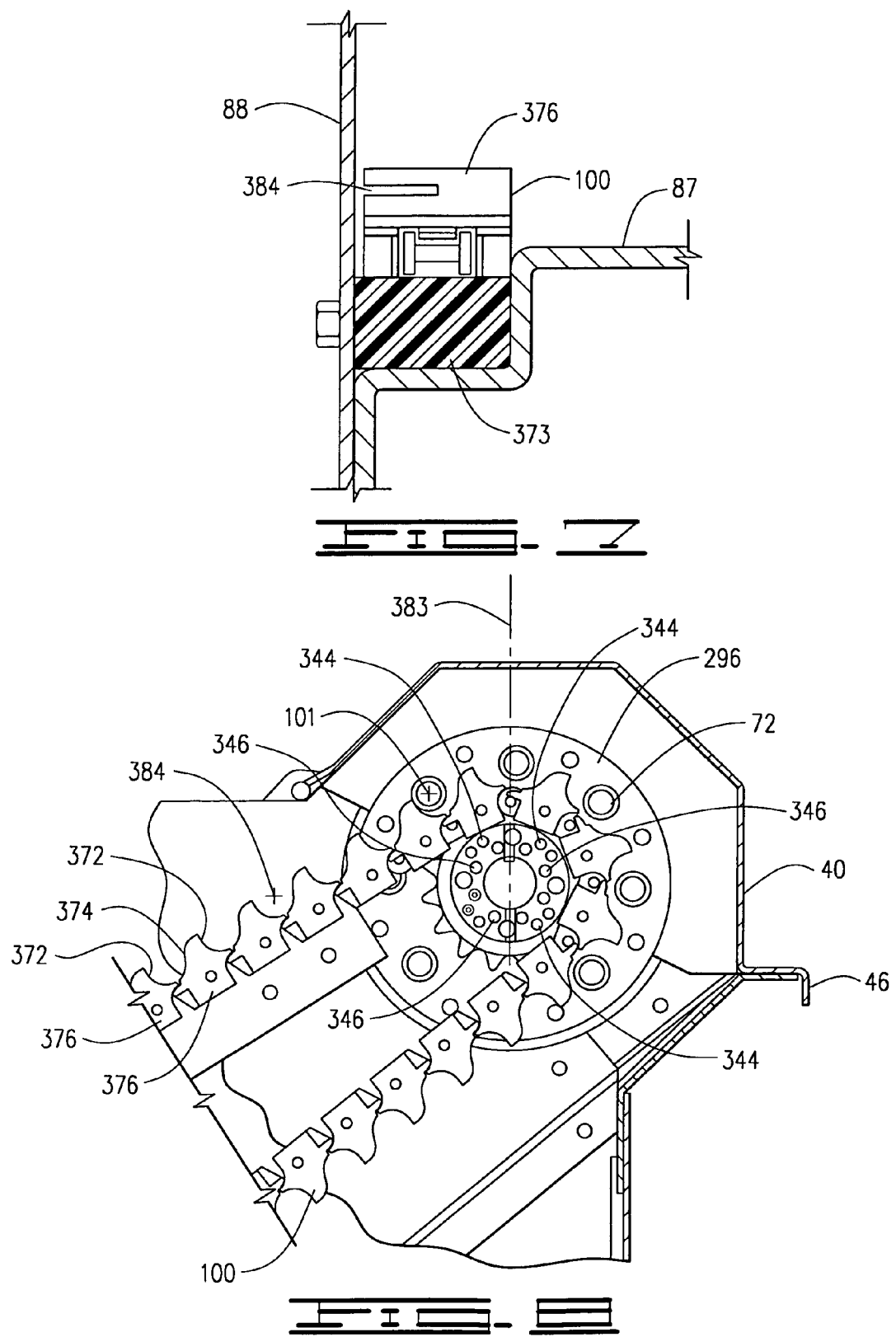

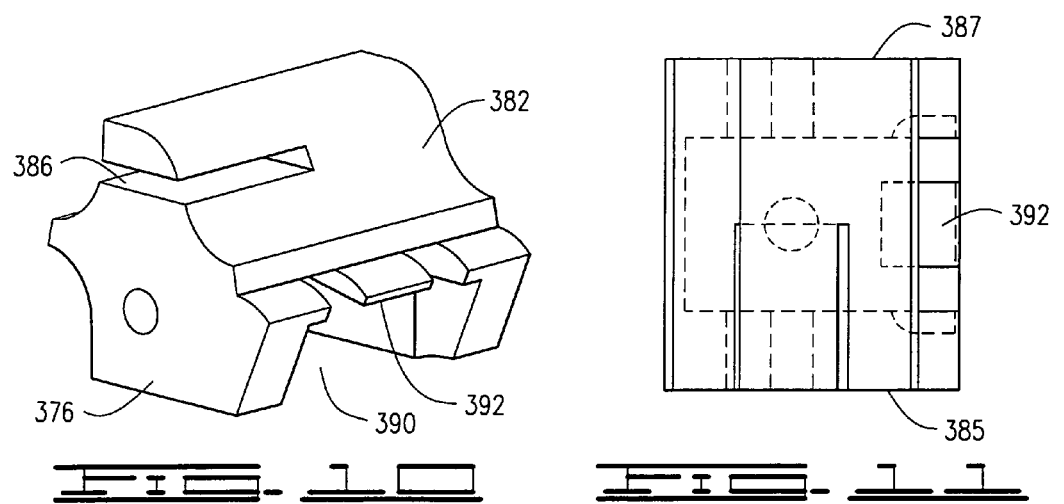
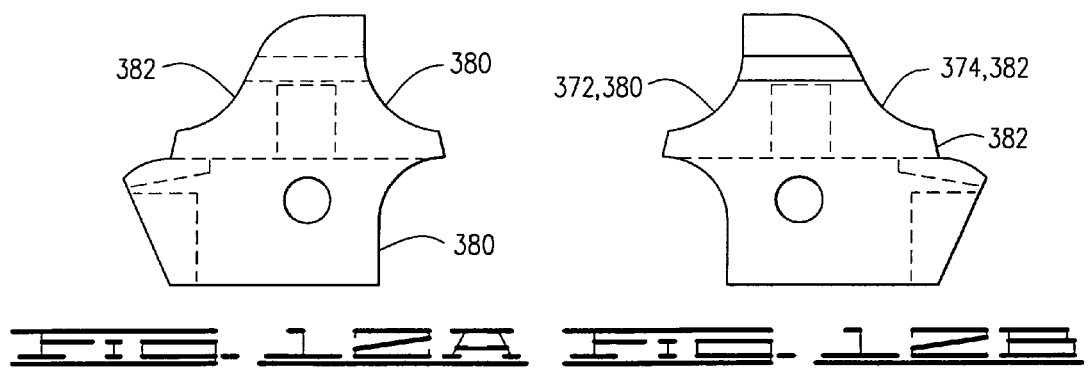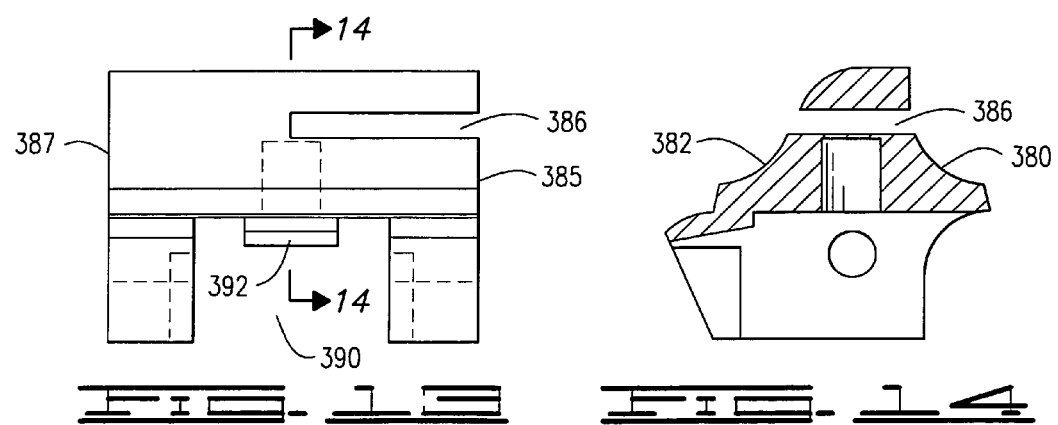

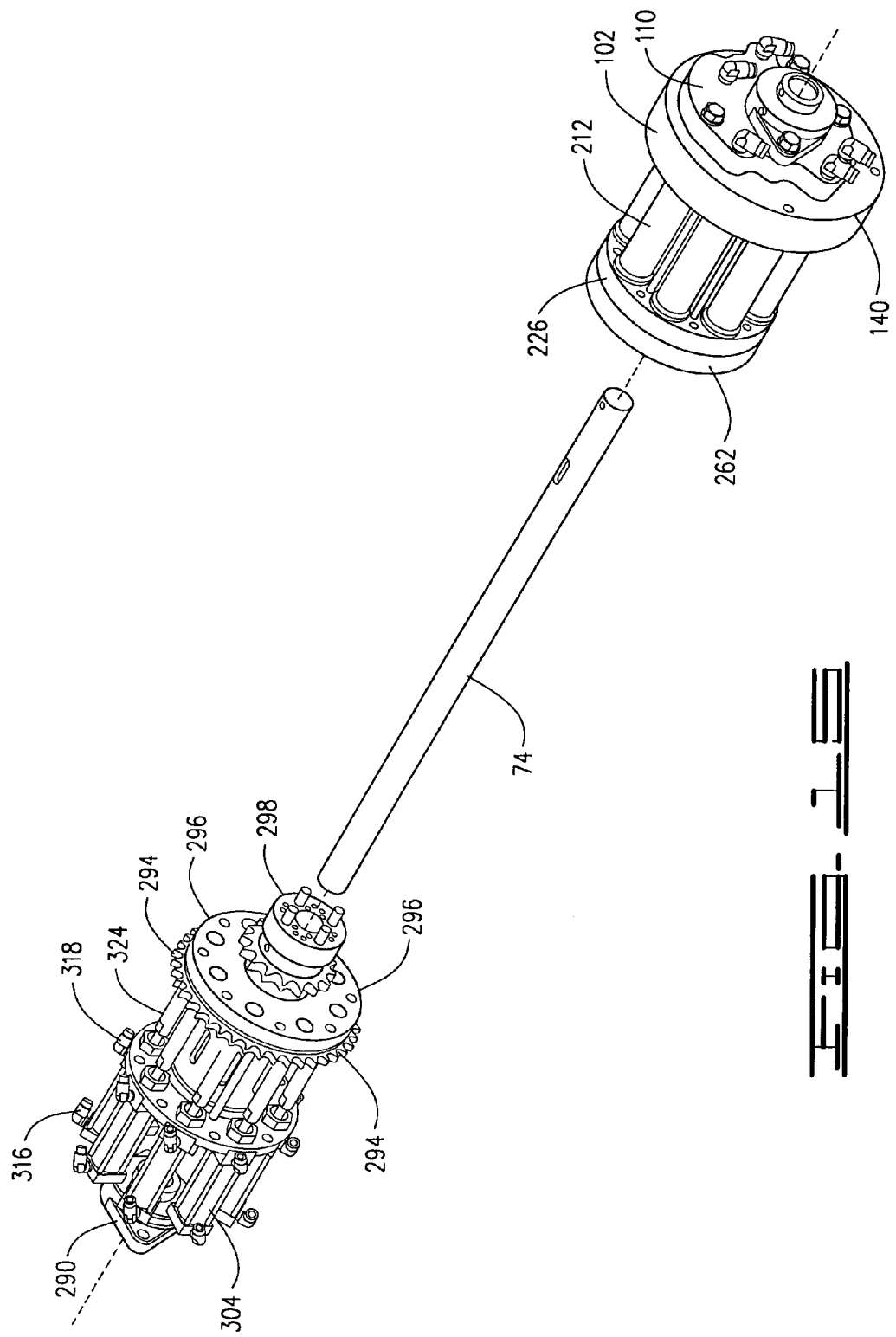

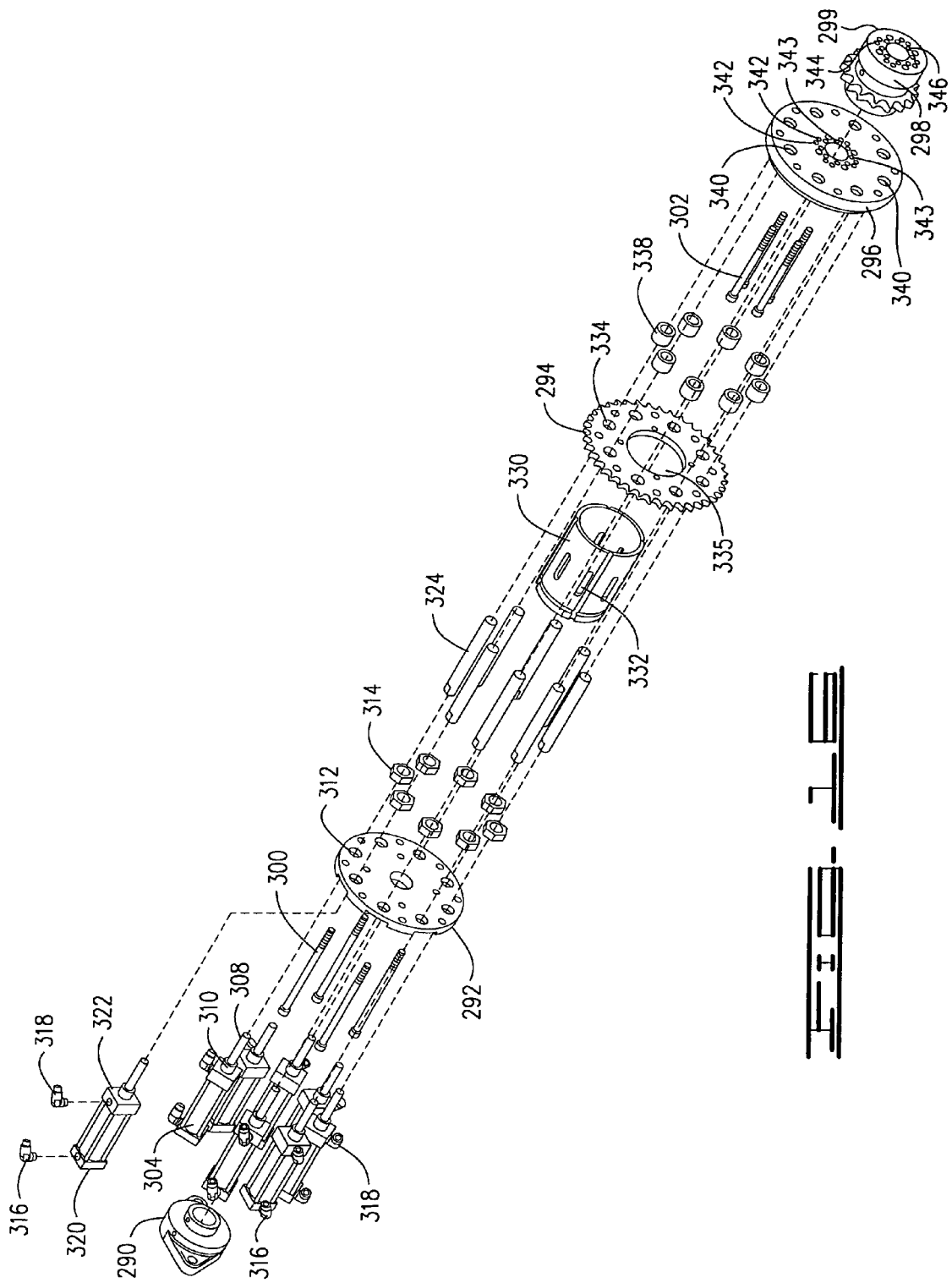

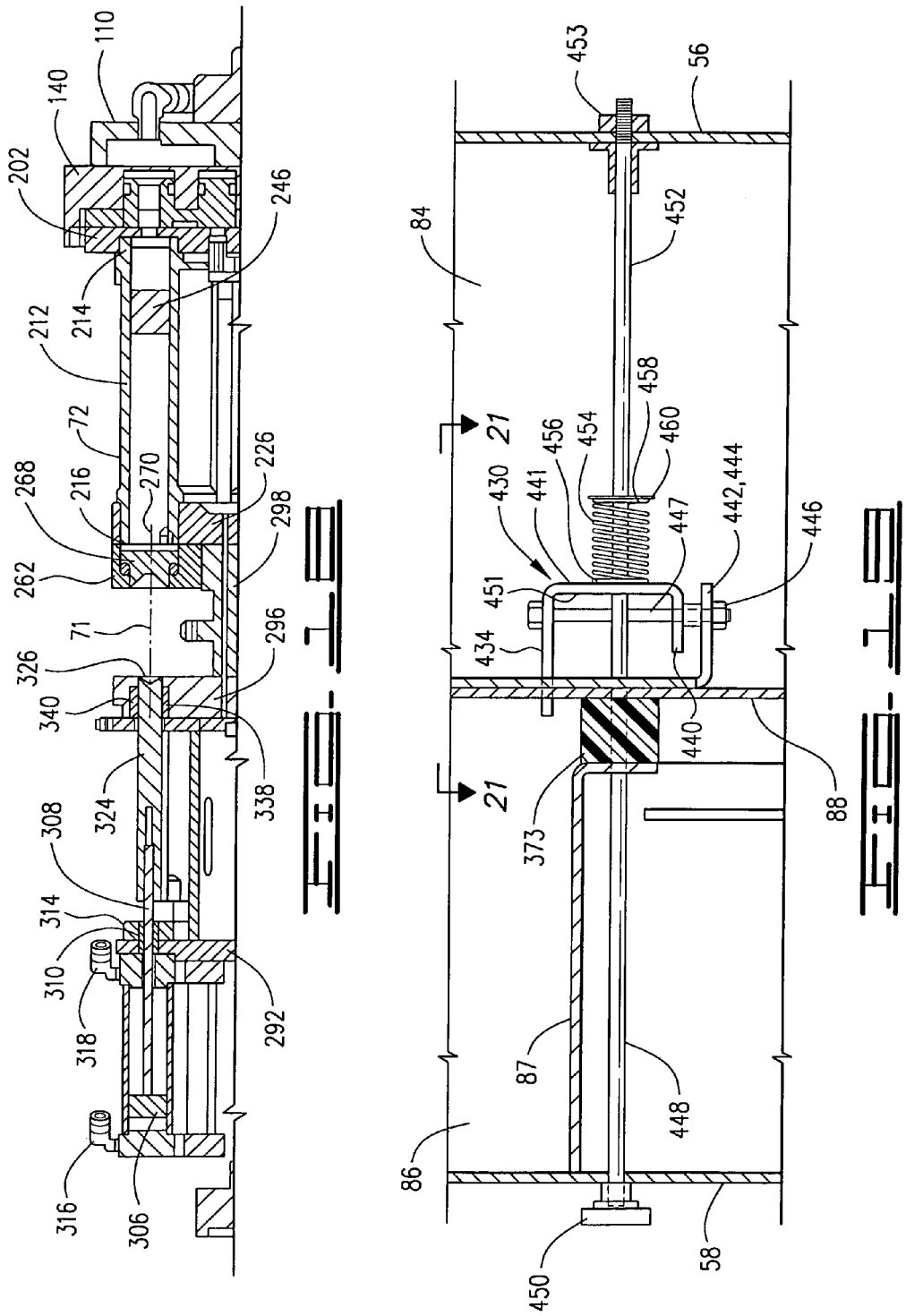

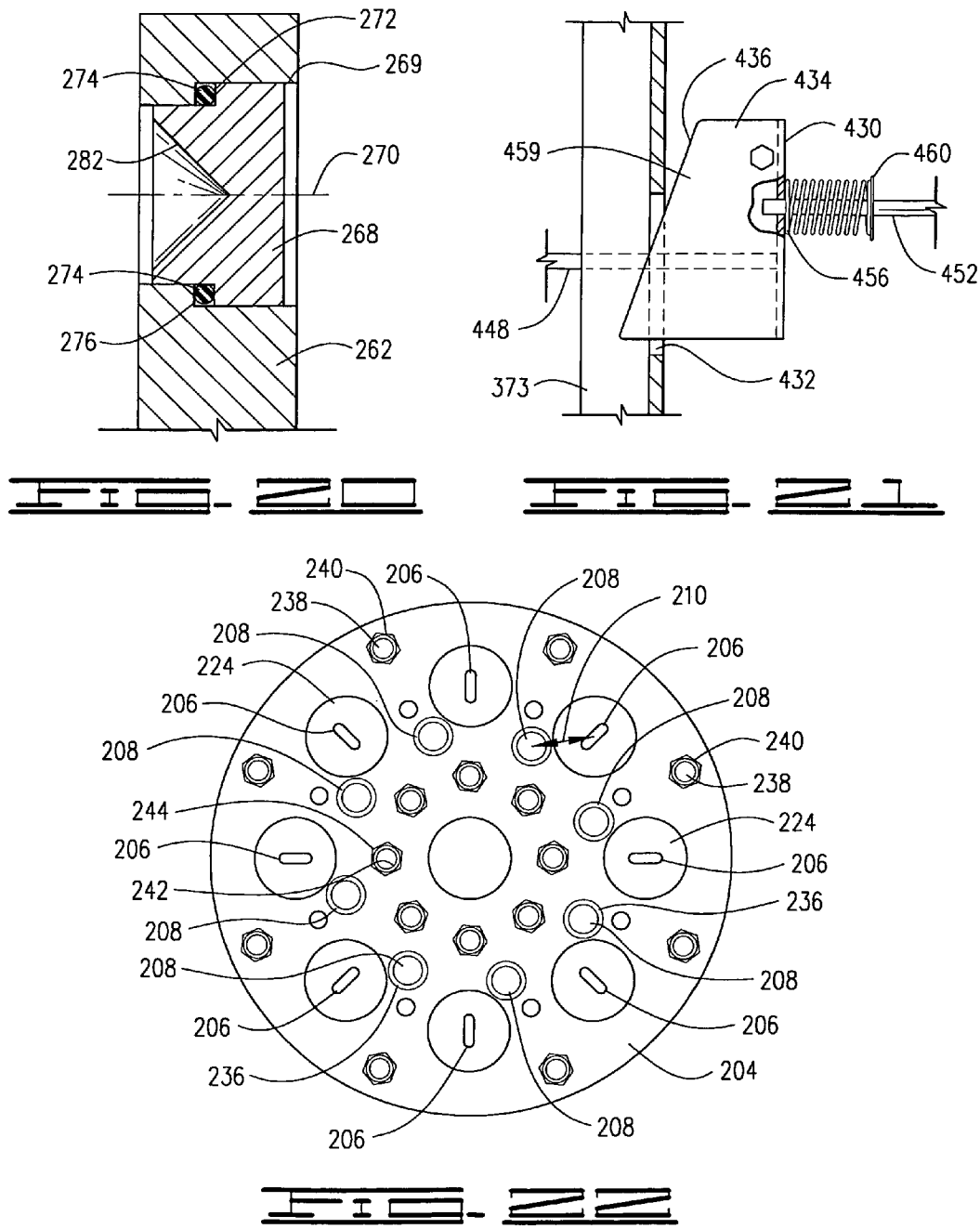

NUT-CRACKING APPARATUS

FIELD OF THE INVENTION

The present invention relates to an apparatus for cracking nuts at high production rates, and more specifically to a nut-cracker for cracking nuts at high production rates that is compact and that efficiently cracks and delivers cracked nuts and shell fragments to a receptacle.

There are a number of prior U.S. patents that disclose nut-cracking apparatus including U.S. Pat. Nos. 6,588,328, 6,584,890, 6,270,824, 6,205,915, 6,182,562, 5,623,867, 4,441,414, 4,418,617, 4,332,827. Each of the aforementioned patents discloses an endless feed conveyor that delivers nuts from a hopper or bin to a rotating turret. The rotating turret includes nut-cracking units that engage the nuts to be cracked at a pickup point to remove the nuts from the endless conveyor. The feed conveyor generally includes a feed chain disposed about a plurality of sprockets. A plurality of nut-carrying, or nut-transporting units on the feed chain deliver the nuts to be cracked from the hopper to the pickup point. Methods and apparatus disclosed in the aforementioned patents include pneumatic systems associated with the nut-cracking units. The nut-cracking units crack the nuts, and in many of the devices loose shell fragments are drawn off by a vacuum line and the cracked nut is delivered to a separate discharge chute. Although there are a number of prior art nut-cracking apparatus, there is still a need for improved methods and apparatus for high production nut-cracking. One such improved apparatus is disclosed in U.S. patent application Ser. No. 10/718,378, assigned to the assignee of the current invention, and incorporated herein by reference. There is, however, a continuing need for nut-cracking apparatus that are compact, and effectively and efficiently crack nuts at high production rates with less wear on the apparatus.

SUMMARY OF THE INVENTION

The nut-cracking apparatus of the current invention has a bin or hopper for holding nuts, for example pecans. The invention includes an endless conveyor mounted about a plurality of sprockets and preferably mounted around a rear and forward sprocket. The endless conveyor comprises a feed or drive chain and a plurality of nut-carrying or nut-transporting units that may be referred to herein as nut pockets.

A turret comprising a plurality of nut-cracking units is rotatably mounted to a frame. The nut-cracking apparatus has a door, or lid pivotally attached to the frame that moves between an open position, wherein the turret is exposed, and a closed position, wherein the turret is covered by the lid. The lid is typically in the closed position when the nut-cracking apparatus is in operation. During operation, the nut-cracking units will engage nuts positioned in the nut pockets on the endless conveyor at a pickup or delivery point. The nut-cracking units comprise a rod, or anvil and a crack die between which a nut is held for cracking. After the nut is engaged, air is supplied to a shuttle cylinder or shuttle pipe operably associated with the crack die which will cause a shuttle in the shuttle pipe to impact the crack die and crack the nut. The anvil will move away from the crack die and release the cracked nut.

The endless conveyor of the current invention includes split nut pockets comprised of a first and second nut pocket portion. The nut pockets are comprised of nut pocket segments connected to a drive chain. Each nut pocket segment has a first nut pocket portion and a second nut pocket portion defined thereon so that a single nut pocket is defined by adjacent nut pocket segments which open or separate from a carrying or closed position to an open or separated position. Each nut pocket is preferably in a fully open or separated position when the nut delivered by the nut pocket is cracked, so that the nut is not confined in any way which allows the shell to crack more effectively and helps to abate any damage to meat that might occur during the cracking process due to the nut being held tightly on any side thereof.

BRIEF DESCRIPTION OF THE DRAWINGS

FIG. 1 is a perspective view of the nut-cracking apparatus of the current invention.
FIG. 4 is a section view taken from line 4-4 of FIG. 3.
FIGS. 6A and 6B are views taken from line 6A-6A and 6B-6B of FIG. 4 and shows the divider plate and deflectors.
FIG. 6C is a view taken from line 6C-6C of FIG. 4 and shows only the divider plate and a deflector.
FIG. 7 is a view taken from line 6-6 of FIG. 5 showing the divider plate and slide mounted to the divider plate.
FIG. 8 is an expanded view showing a portion of the view from line 4-4 of FIG. 3.
FIG. 10 is a perspective view of a nut pocket segment.
FIG. 11 is a top view of a nut pocket segment.
FIGS. 12A and 12B are side views of a nut pocket segment.
FIG. 13 is a view of the front side of a nut pocket segment.
FIG. 14 is a view from line 14-14 of FIG. 13.
FIG. 15 is an exploded view of the turret assembly.
FIG. 16 is an exploded view of the left portion of the turret assembly.
FIG. 18 is a section view of one nut-cracking unit.
FIG. 19 is a partial cross-section showing connection of the adjustable singulator plate.
FIG. 20 is a section view showing a crack die in a crack die holder.
FIG. 21 is a view from line 21-21 of FIG. 19 showing a singulator plate.
FIG. 22 shows the left side of the rotatable valve plate.
FIG. 27 shows the connection of the motor to the frame.

DETAILED DESCRIPTION OF THE PREFERRED EMBODIMENTS

Figure 2:
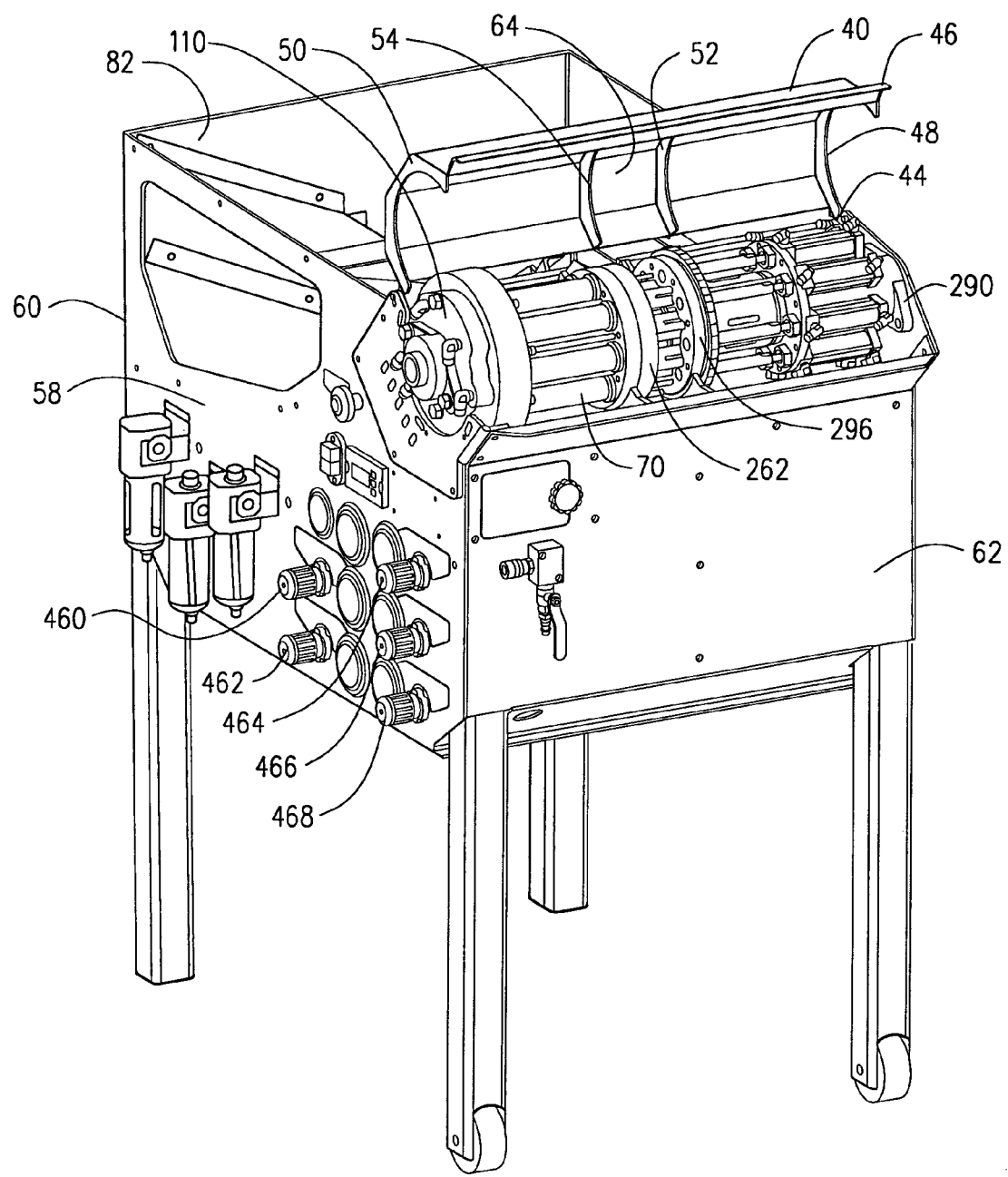
FIG. 2 is a perspective view of the apparatus with the lid open showing the turret.
Figure 3:
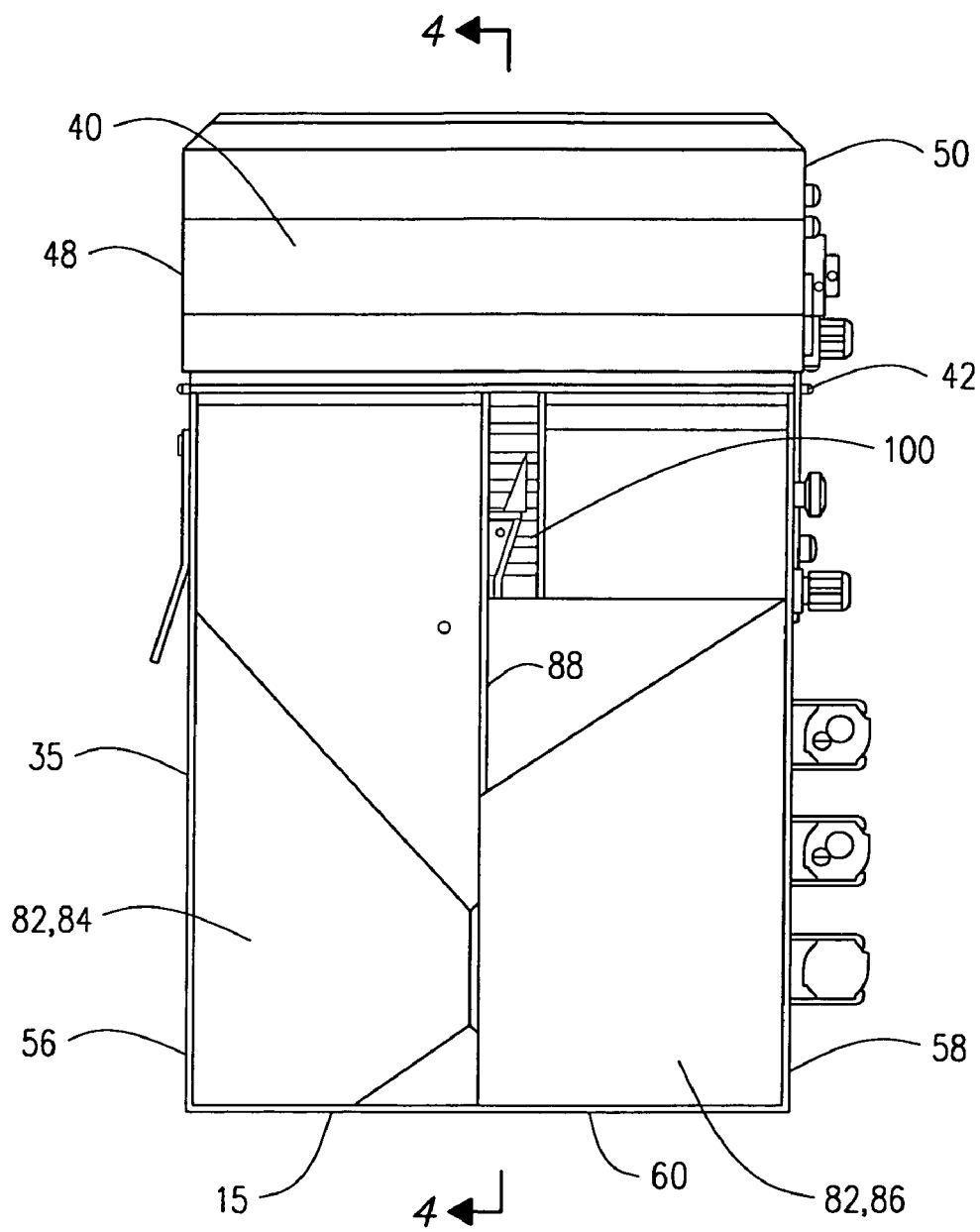
FIG. 3 is a view of top view of the nut-cracking apparatus.

Referring to the drawings and more specifically to FIGS. 1 and 2, a nut-cracking apparatus 10 embodying the features of the current invention is illustrated. Nut-cracking apparatus 10 has a rear end 15, a forward end 20 and left or first and right or second sides 25 and 30, respectively. Nut-cracking apparatus 10 comprises a frame 35 with a door or lid 40 pivotally attached thereto and movable between the open position shown in FIG. 2 and the closed position shown in FIG. 1. Door 40 is pivotally attached to frame 35 with rod 42 at the rear edge 44 of door 40. Lid or door 40 likewise has a forward edge 46 and left and right sides 48 and 50, respectively. A pair of ribs 52 with arcuate edge 54 are attached to an inner surface of lid 40. The frame has left and right sides 56 and 58, respectively, and rear and forward ends 60 and 62, respectively. Ribs 54 define at least a portion of a containment chamber 64, which will contain or confine shell fragments when nuts are cracked by the apparatus 10.

Figure 5:
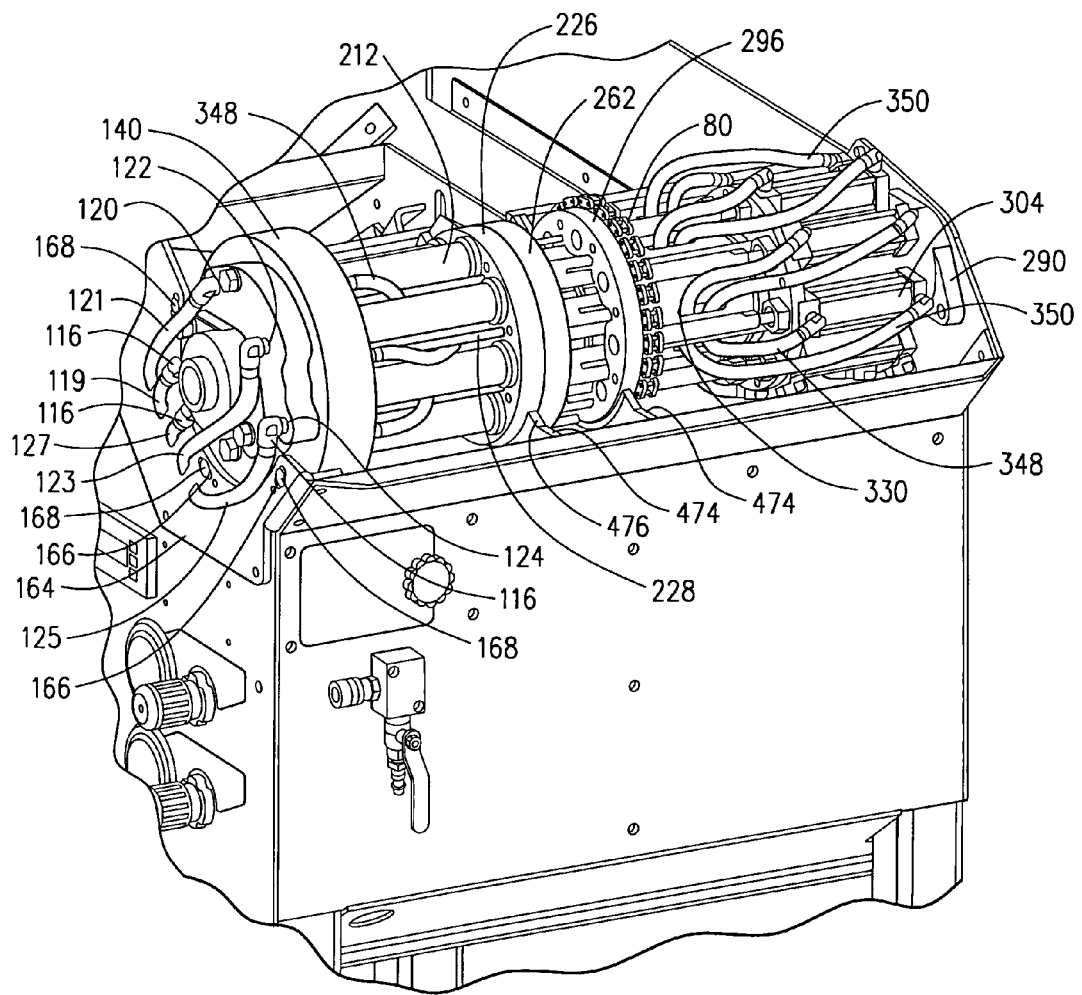
FIG. 5 is a perspective view of the turret mounted in the frame.
Figure 17:
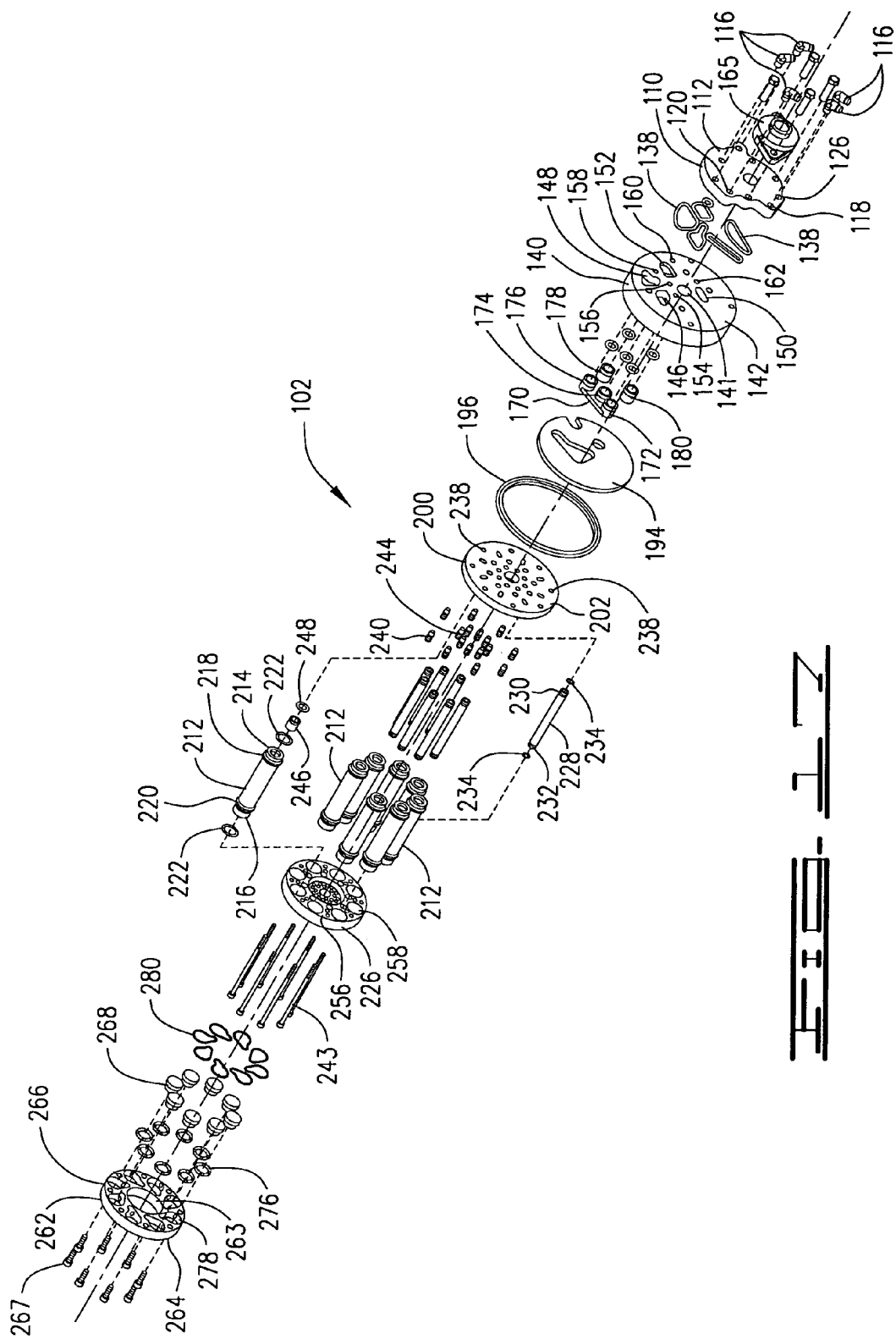
FIG. 17 is an exploded view of the right portion of the turret assembly.
Figure 23:
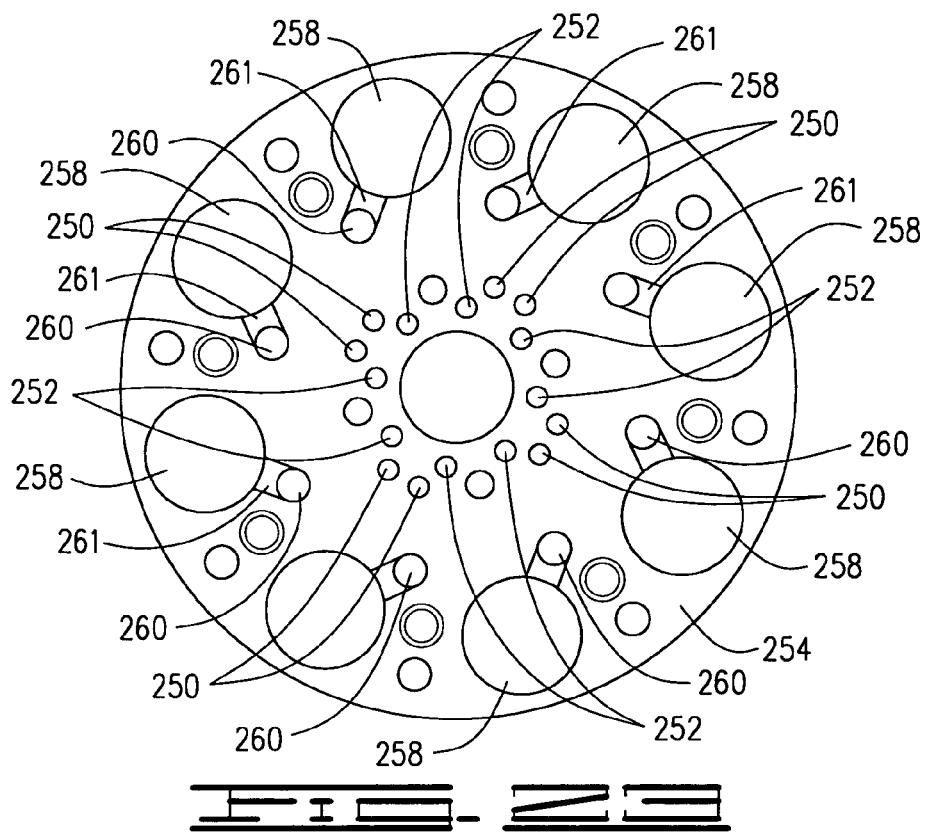
FIG. 23 shows the left side of the crack die mount plate.
Figure 24:
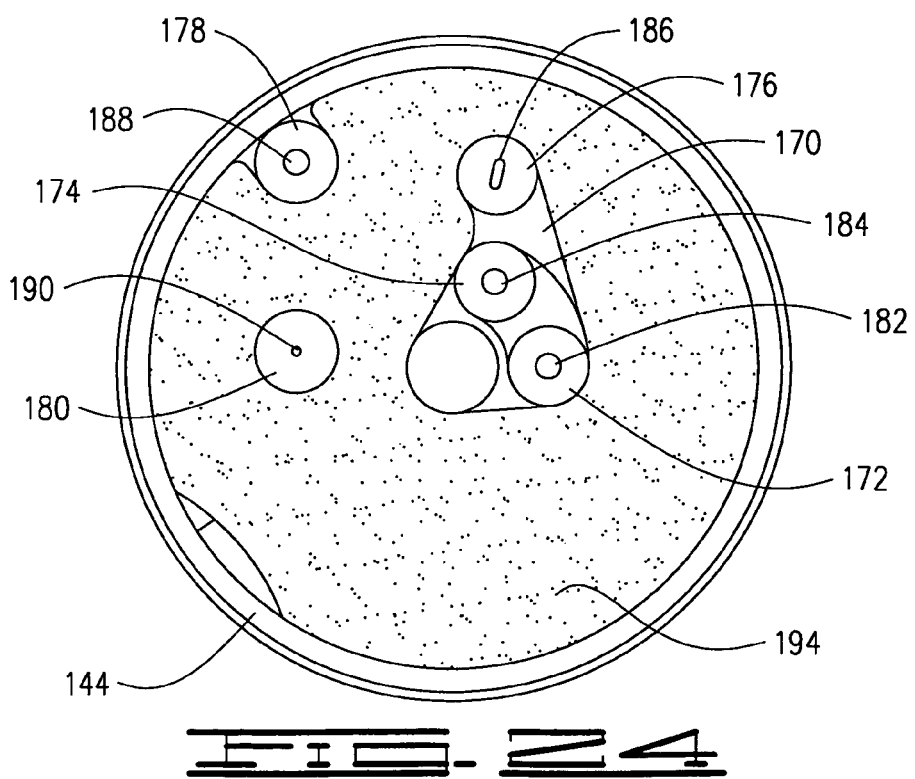
FIG. 24 shows the left side of the valve plate with bushings positioned therein.

A turret 70 is rotatably mounted in frame 35. Turret 70 includes a plurality of circumferentially spaced nut-cracking units 72. Nut-cracking units 72 may have a longitudinal central axis 71. Turret 70 is mounted on a shaft 74. The turret is driven by a motor 76 mounted in frame 35. Motor 76 has a sprocket 78 attached thereto. A chain 80 (shown in FIG. 5) is disposed about sprocket 78 and is driven by motor 76 to rotate turret 70. FIG. 17 schematically shows motor 76 attached to a bracket 81, which is attached to left side 48 of frame 35.

Frame 35 defines a hopper or hopper portion 82 for holding nuts 83 to be delivered to turret 70 and specifically to nut-cracking unit 72. Hopper 82 is divided into a first or left side portion 84 and a second or right side portion 86 separated by divider plate 88. Second hopper portion 86 has floor 87. Motor 76 is positioned beneath hopper portion 84, between divider plate 88 and left side 48 of frame 35. Nuts are placed in first or left side portion 84 of hopper 82 and pass into right side portion 86 through an opening 90 in divider plate 88. An adjustable gate 92 may be attached to divider plate 88. Adjustable gate 92 has slots 94 therein and is connected with threaded members 96 which extend through slots 94 into or through divider plate 88. Threaded members 96 may have a nut or other connector on the opposite side thereof. Members 96 may be loosened so that the height of gate 92 can be adjusted to control the rate of flow of nuts from first or left side portion 84 into second or right side portion 86. An endless conveyor 100 picks up nuts that pass through opening 90 and moves nuts 83 toward turret 70, to a delivery point, or pickup point 101, where the nuts are engaged by nut-cracking units 72.

The details of turret 70 are explained with reference to FIGS. 15-17 which show exploded views of the turret assembly 70. The right or right side portion 102 of turret assembly 100 is shown in an exploded view in FIG. 17 and left or left side portion 104 of turret assembly 70 is shown in an exploded view in FIG. 16.

Figure 25:
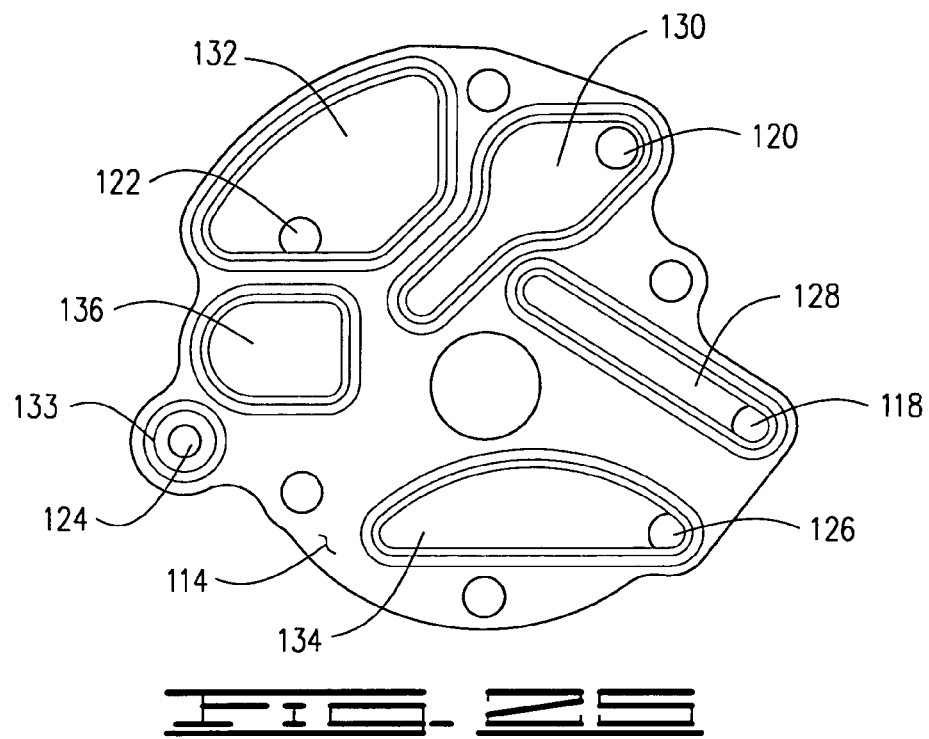
FIG. 25 shows the left side of the bearing spacer plate.
Figure 26:
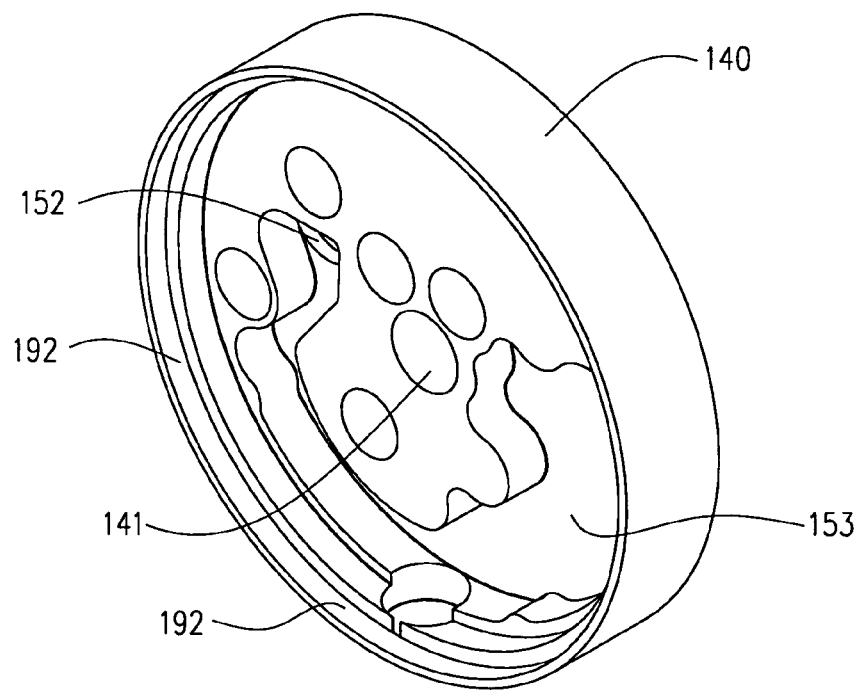
FIG. 26 is a perspective view showing the left side of the valve plate.

Referring now to FIG. 17, nut-cracking apparatus 10 includes a bearing spacer plate 110 having right side 112 and left side 114. A plurality of fittings 116 are threaded to holes in spacer plate 110. Air is supplied to fittings 116 by a plurality of air hoses, shown in FIG. 5. Air will be supplied to a feed opening 118 with air hose 119, a stress opening 120 with air hose 121, a crack opening 122 with air hose 123, release opening 124 with air hose 125 and reset opening 126 with air hose 127. As shown in FIG. 25, spacer plate 110 has a plurality of cavities on the left side 114 thereof. The cavities may be referred to as accumulators and may include a feed accumulator 128, a stress accumulator 130, crack accumulator 132, release accumulator 133 and reset accumulator 134. An auxiliary accumulator 136 may also be defined therein. Each of the accumulators or cavities may have an O-ring 138 shaped to match the shape of the accumulator and disposed therein.

Spacer plate 110 is attached with fasteners to a valve plate 140. Valve plate 140 has right side 142 and left side 144. Valve plate 140 has a central opening 141 through which shaft 74 is received. Valve plate 140 has cavities and openings that correspond to accumulators in spacer plate 110, and thus includes a stress cavity 146, a crack cavity 148 and reset cavity 150 on the right side 142 of valve plate 140. An opening 152 through valve plate 140 corresponds to auxiliary cavity 136 in bearing spacer plate 110 and communicates with a cavity 153 on left side 144 of valve plate 140. Valve plate 140 has feed, stress, crack, release and reset openings 154, 156, 158, 160 and 162, respectively. Air communicated into the openings in spacer plate 110 will be communicated to the feed, stress, crack, release and reset openings 154, 156, 158, 160 and 162 from the feed, stress, crack, release and reset openings 118, 120, 122, 124 and 126, respectively. Air is directed in some cases by the accumulators on the left side 114 of spacer 110. Thus, accumulators 128, 130, 132, 133 and 134 will direct air into corresponding openings in valve plate 140. Release opening 124 is preferably directly aligned with release opening 160, so that air is communicated directly therethrough. In other words, openings 124 and 160 preferably have a common longitudinal central axis.

Valve plate 140 is a stationary valve plate, and is fixedly mounted to a connector plate 164 which is connected to frame 35. A flanged bearing 165 is bolted or otherwise connected to spacer plate 110 and shaft 74 is mounted in flanged bearing 165 in a manner known in the art. Connector plate 164 has a plurality of slots 166 with threaded fasteners 168 inserted therethrough and threaded into valve plate 140 to mount valve plate 140 to frame 35. The slots 166 allow the adjustment of the rotational position of valve plate 140 by loosening fasteners 168, slightly rotating valve plate 140, and tightening fasteners 168 to fix valve plate 140 in place.

A valve bank 170, that includes connected feed, stress and crack bushings 172, 174 and 176, respectively, is positioned on the left side 144 of valve plate 140 in a cavity machined to substantially match the shape of valve bank 170. A release bushing 178 and reset bushing 180 are also positioned in cavities in valve plate 140. Feed, stress, crack, release and reset bushings 172, 174, 176, 178 and 180 define feed opening, stress opening, crack opening, release opening, and reset opening 182, 184, 186, 188 and 190, respectively. Crack opening 186 may comprise a slot as shown in FIG. 12. Valve plate 140 defines a peripheral lip 192 in which a felt liner 194 may be received along with a seal 196.

Turret 70 includes a rotatable valve plate 200 which has right side 202 and left side 204. Rotatable valve plate 200 may be referred to as valve pipe plate 200, and has a plurality of openings therein including a plurality of crack and reset openings 206 and 208, respectively. Crack openings 206 may be slots as shown in FIG. 22. Air will pass through crack opening 186 into crack opening 206 in rotatable valve plate 200. Because both crack openings 186 and 206 are slots, and will align, the slot configuration allows air to pass into the rotating valve plate immediately. In prior configurations, the crack openings were simply round holes, or a combination of round holes in the bushing and oblong holes in the plate, which allowed initial seepage before the cracking of a nut. With the slots, the air is immediately supplied to crack a nut as described below. The crack bushing 176 is fixed against rotation since it is part of valve bank 170, and is connected to feed and stress bushings 172 and 174. Rotatable valve plate 200 is rotatable relative to valve plate 140 and is positioned adjacent to, and preferably slidably engages valve bank 170, release bushing 178, and reset bushing 180 so that air passing through the feed, stress, crack, release and reset bushings 172, 174, 176, 178 and 180 will pass directly into corresponding openings in valve plate 200. Each crack opening 206 and its corresponding reset opening 208 may be referred to as a pair of openings 210. In the embodiment shown, there are eight pairs 210 corresponding to the eight nut-cracking units 72.

Right portion 102 of turret assembly 70 includes a plurality, and in the embodiment shown, eight shuttle pipes 212 having first and second ends 214 and 216, respectively. Shuttle pipes 212 have first shoulder 218 and second shoulder 220 positioned at the ends 214 and 216, respectively, of shuttle pipes 212. O-rings 222 may be disposed about shuttle pipes 212 at the first and second ends 214 and 216 thereof.

First end 214 is inserted into a counterbore 224 on left side 204 of valve plate 200 and receives air from a crack opening 206. Second end 216 is inserted into an opening in crack die mount plate 226 which is explained in more detail hereinbelow. A plurality of reset pipes 228 having first ends 230 and second ends 232 likewise extend between rotatable valve plate 200 and crack die mount plate 226. O-rings 234 may be disposed at the first and second ends 230 and 232 of reset pipes 228. First end 230 is received in counterbore 236 in rotatable valve plate 200 so that the reset pipe 228 receives air from reset opening 208. A plurality of radially outer openings 238, which may be referred to as release openings, in valve plate 200, have fittings 240 threadably connected therein on left side 204 of rotatable valve plate 200, and are utilized to supply release air. Radially inner openings 242, which may be referred to as feed/stress openings 242, have fittings 244 threadably connected therein on left side 204 of plate 200, and are utilized to supply feed and stress air.

A plurality of fasteners 243 extend through crack die mount plate 226 and are threaded into rotatable valve plate 200 to connect crack die mount plate 226 thereto. A shuttle 246 is slidably disposed in shuttle pipe 212 and may have an O-ring 248 disposed in a groove therein. Shaft 74 will extend through both of plates 200 and 226, and the rotation of shaft 74 will cause rotation of both of plates 200 and 226 which are fixedly connected to one another with fasteners 243.

Crack die mount plate 226 has a plurality, and preferably eight openings 250 and a plurality, and preferably eight openings 252 through which release air hoses and feed/stress air hoses, respectively, will pass as will be explained in more detail hereinbelow. Crack die mount plate 226 has left side 254 and right side 256. Shuttle pipes 212 are inserted into openings 258, which may be referred to as crack openings, from the right side thereof and reset pipes 228 are inserted into openings 260, which may be referred to as reset openings, in crack die mount plate 226 through the right side thereof. A groove 261 connects openings 258 and 260 so that air communicated through reset pipe 228 will pass through groove 261 and will enter end 216 of shuttle pipe 212 to reset the shuttle by moving shuttle 246 therein towards end 214 of shuttle pipe 212.

A crack die holder 262 has a central opening 263, and has left and right sides 264 and 266. Crack die holder 262 is connected with fasteners 267, or other means known in the art to crack die mount plate 226. Crack die holder 262 has a plurality of crack dies 268 mounted in openings 269 therein. Each crack die 268 has central axis 270 and may have a generally T-shaped cross section so that it defines a shoulder 272 thereon. An O-ring 274 may be positioned between shoulder 272 and a shoulder 276 defined on an opening 269 in crack die holder 262. Crack die holder 262 may have grooves 278 on the right side 266 therein to receive O-rings 280 configured to match the shape of grooves 278. Each crack die 268 has a generally conically shaped nut engagement surface 282.

A flanged bearing 290 supports shaft 74 on the left side 56 of frame 35. Left portion 104 of turret 70 includes a cylinder mount plate 292, a drive sprocket or forward sprocket 294, a cylinder rod bushing plate 296 and a nut chain sprocket hub 298. Cylinder rod bushing plate 296 is keyed or otherwise connected to shaft 74 and will rotate therewith. Fasteners 300 extend through cylinder mount plate 292 and drive sprocket 294 and may be threaded into cylinder rod bushing plate 296. Fasteners 302 extend through cylinder rod bushing plate 296 and nut chain sprocket 298 and are threaded into crack die mount plate 226. A hub portion 299 of chain sprocket hub 298 extends into opening 263 of crack die holder 262, and shaft 74 is received therethrough. Rotation of sprocket 294 will cause cylinder rod bushing plate 296 to rotate, which will rotate shaft 74, and will cause rotation of cylinder mount plate 292, nut chain sprocket 298, and crack die mount plate 226. Because of the connections described, both sides 102 and 104 of turret 70 rotate together.

Apparatus 10 includes air cylinders 304 which have a piston 306 disposed therein. Each piston 306 is connected to a piston rod 308. A threaded boss 310 extends through an opening 312 in cylinder mount plate 292 so that the cylinders 304 may be connected to cylinder mount plate 292 with jam nuts 314. Fittings 316 and 318 are connected to each cylinder 304 at the first and second ends 320 and 322 thereof. Air is supplied to fittings 316 and 318 to move piston 306 and piston rod 308. Piston rod 308 is connected to a rod extension 324 which as shown in FIG. 19 has a conically shaped end 326 and may be referred to as an anvil. A spacer pipe 330 with a plurality of slots 332 is disposed about shaft 74, and maintains proper spacing between cylinder mount plate 292 and drive sprocket 294. Spacer pipe 330 preferably has eight slots 332 for the routing of air hoses connected to fittings 318 and 316, respectively.

Sprocket 294 has a plurality of piston rod openings 334 for the passage of rod extensions 324 therethrough, and has a central opening 335. A plurality of piston rod bushings 338 are disposed in openings 340 in cylinder rod bushing plate 296. Rod extensions 324 are slidably received in bushings 338. Cylinder rod bushing plate 296 has radially outer hose openings 342 and radially inner hose openings 343, and preferably has eight each of openings 342 and 343. Nut chain sprocket 298 has radially outer hose openings 344 and preferably has eight outer hose openings 344 and a plurality of radially inner hose openings 346 and preferably has eight inner openings 346.

Nut-cracking apparatus 10 includes a plurality of release air hoses 348 connected at one end to fittings 240 which are threaded into outer openings 238 in rotatable valve plate 200. Each release air hose 348 is routed through an opening 250 in crack die mount plate 226 and passes through central opening 263 in crack die holder 262. Release air hoses 348 pass through outer openings 344 in sprocket 298, outer openings 342 in cylinder rod bushing plate 296, through central opening 335 in sprocket 294 and into spacer pipe 330. Release hoses 348 pass from the interior of spacer pipe 330 through slots 332, and are connected to fittings 318 at the second end 322 of air cylinder 304.

Apparatus 10 has a plurality of feed/stress tubes 350, and preferably eight tubes 350. Each tube 350 is connected to a fitting 244 which is threaded in a radially inner opening 242 in rotatable valve plate 200. Each feed/stress tube 350 passes through an opening 252 in crack die mount plate 226, central opening 263 in crack die holder 262, inner opening 346 in sprocket 298, inner opening 343 in cylinder rod bushing plate 296 and central opening 335 in sprocket 294. Each feed/stress air tube 350 then passes into spacer pipe 330 and out slots 332 and is attached to a fitting 316 at first end 320 of air cylinder 304 to provide feed and stress air thereto.

Figure 9:
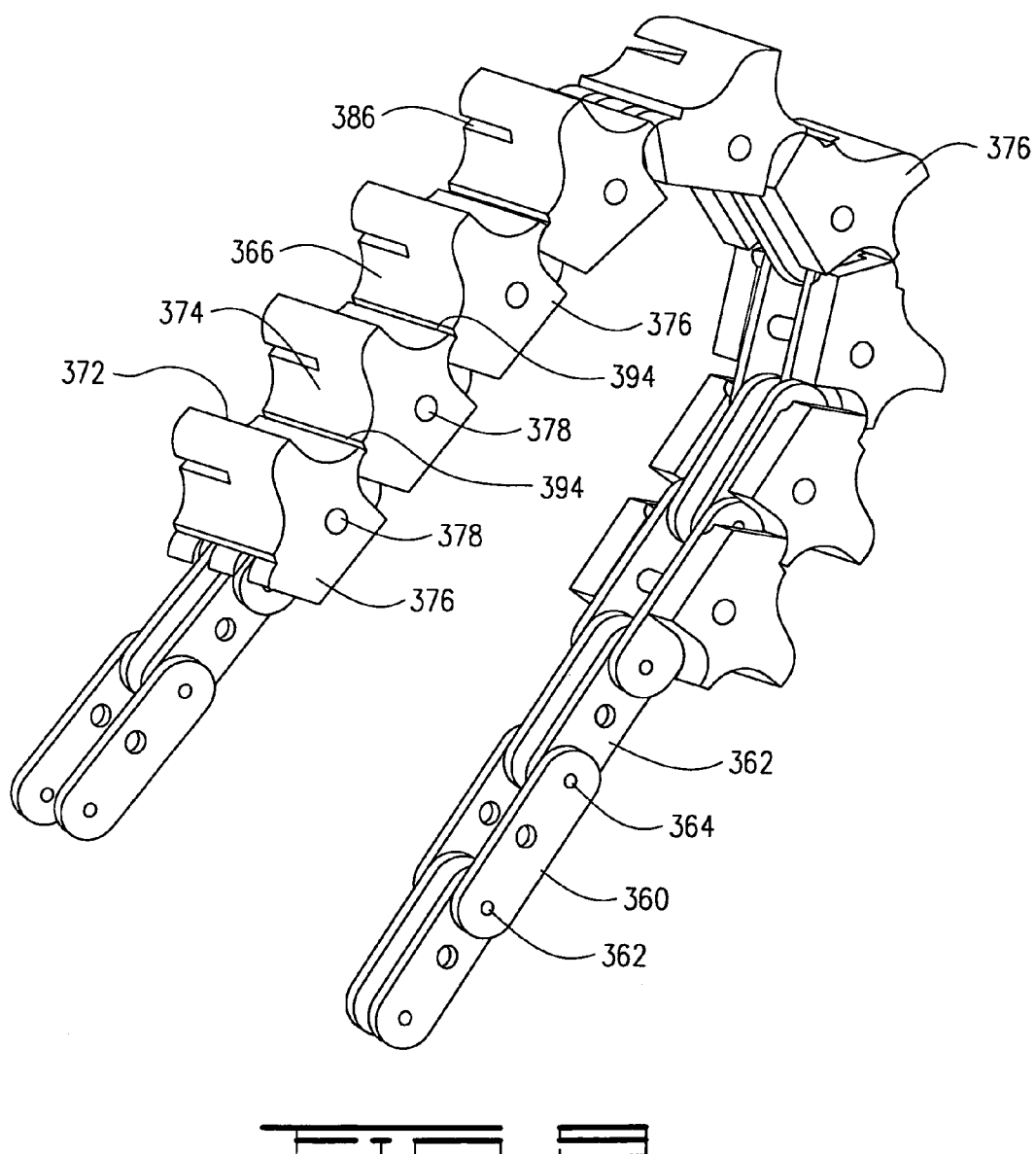
FIG. 9 is a view of a portion of the endless conveyor of the current invention.

Referring now to FIGS. 4, 8 and 9, endless conveyor 100, which may also be referred to as nut pocket chain 100, comprises a drive chain 360 made up of a plurality of connected links 362. Links 362 are connected to one another with pins 364 in a manner known in the art. Conveyor 100 includes a plurality of nut pockets 366 which will carry nuts 83 from hopper 82 to delivery point 101. At delivery point 101, a nut 83 is engaged by a nut-cracking unit 72.

Endless conveyor 100 is mounted to a rear sprocket 370 which is rotatably mounted to divider plate 88 in a manner known in the art, such as with a rod and bearing arrangement. Sprocket 370 may be referred to as a rear sprocket 370. Conveyor 100 is also mounted, or disposed about nut chain sprocket 298, which may be referred to as forward sprocket 298. The upper portion of endless conveyor between sprockets 298 and 370 may be referred to as upper run 371. Upper run 371 may be supported by a slide 373 mounted to divider plate 88.

Nut pockets 366 may be referred to as split nut pockets or separable nut pockets comprised of a first nut pocket portion 372 and second nut pocket portion 374. First and second nut pocket portions 372 and 374, and thus nut pockets 366 are defined by a plurality of nut pocket segments 376. Each nut pocket segment 376 is pivotally connected to a link 362 in chain 360. Each segment 376 is connected with a pin 378 positioned between pins 364 which attach links 362 to one another. Each nut pocket segment 376 has a forward side 380 which comprises a curved surface and a rear side 382 which likewise comprises a curved surface, and each nut pocket 366 is defined by a pair of adjacent nut pocket segments 376. More specifically the first portion 372 of each nut pocket 366 is defined on the forward side 380 and second portion 374 is defined on the rear side 382 of the adjacent nut pocket segment 376. Each nut pocket 366 is separable from a closed or carrying position to an open or separated position. Nut pocket 366 is in its closed position as it carries a nut 83 from hopper 82 towards delivery point 101. Delivery point 101 is the point at which a nut-cracking unit 72 engages the nut 83. Delivery point 101 may be a point at which a center 384 of the nut pocket has passed the longitudinal central axis 73 of the nut-cracking unit 72. The delivery point may be between 27 and 30 degrees and preferably is approximately 28.7 degrees counterclockwise from vertical line 383 as shown in FIG. 8.

Nut pockets 366 begin to separate as links 362 on chain 360 begin to engage teeth on nut chain sprocket 298 and thus begin to pivot relative to one another. As endless conveyor 100 moves around sprocket 298, segments 376 will separate thus causing nut pockets 366 to split or separate to the open position. Each nut pocket 366 may begin to move from the closed to the open position either slightly before or slightly after it reaches delivery point 101 and in the embodiment shown, nut pocket 366 begins to open before delivery point 101 is reached. As will be explained in more detail hereinbelow, as the turret 70 rotates, split nut pockets 366 provide more room than prior art nut pockets so that when each nut 83 is cracked, the shell fragment disperses more easily and there is less chance that the nut will be held so tightly by the nut pocket that it doesn't crack adequately or causes damage that could otherwise be avoided to the meat in the nut. FIG. 13 shows the view of the forward end of each segment and shows a slot 386 which may be referred to as a singulator slot 386, extending from a left side 385 of the nut pocket segment 376 towards a right side 387 thereof. Links 362 are received in a link receiving cavity 390 in each nut pocket segment 376. Each nut pocket segment 376 may have a tang 392 on the rear side 382. Tang 392 prevents, or at least limits the amount of shell fragments that can fall between nut pocket segments 376 and into drive chain 360, which lessens the likelihood that shell fragments can bind links 362. The nut pockets 366 are leveling nut pockets in that the pocket configuration will help to level the nuts, or align the nuts between crack dies 268 and rod extensions 324. Because the nut pockets 366 are comprised of separate, adjacent nut pocket segments 376, a groove 394 is defined in each nut pocket 366. Groove 394 may be referred to as a leveling, or alignment groove, since a nut will tend to rest in the grooves and be aligned properly for engagement. The nut 83 will be substantially aligned with the longitudinal central axis 71 of nut-cracking unit 72, and will be in a position for pickup. The leveling, or alignment of the nut will prevent the nut from being held between the anvil 324 and crack die 268 at an angle. The alignment allows for more effective and efficient cracking. As is apparent from the drawings, the nut pocket segments 376 may be attached to a hollow pin chain, to comprise a conveyor with separable, or split nut pockets.

Apparatus 10 has a pair of deflectors 400 which include first and second adjustable deflectors 402 and 404, respectively. Deflector 402 is pivotally attached to divider plate 88 with a pin 406 through connecting strap 408. A deflector plate 410 extends from strap 408 and angles outwardly away from divider plate 88 so that it is positioned over endless conveyor 100. An edge 412 of deflector plate 410 will engage nuts 83 that are positioned atop other nuts 83 in nut pockets 366. A height adjustment screw 414 is threaded through a flange 416 on deflector plate 410 and engages a height adjustment plate 418 which is attached to divider plate 88. Rotation of fastener 414 will adjust the height of regulator plate 410 as desired. Second deflector 404 likewise is connected to divider plate 88 with a fastener 406 through connecting strap 420. Deflector plate 422 extends from connecting strap 420 outwardly away from divider plate 88 so that it is positioned over endless conveyor 100 similar to deflector plate 410 on deflector 402. Use of two deflectors 400 insures that only one nut 83 will be positioned vertically in each nut pocket, and that no stacking will occur. Lower edge 423 of deflector plate 420 will scrape any excess nuts off of nuts positioned in nut pockets 366. The height of edge 423 is adjustable by rotating threaded adjustment member 424 which engages adjustment plate 426 which is attached to divider plate 88 to raise or lower regulator plate 420.

The apparatus 10 further includes an adjustable singulator 430. Singulator 430 extends through a slot 432 in divider plate 88 and extends into slots 386 in nut pocket segments 376. Slot 432 is shows as a line in FIG. 4. Singulator 430 urges nuts outwardly from the left side 385 toward right side 387 of nut pocket segments 376 so that only one nut 83 is carried laterally in each nut pocket 366. The distance the singulator 430 extends into slots 384 in nut segments 376 is adjustable and may be adjusted while nut-cracking apparatus 10 is operating and thus may be adjusted while endless conveyor 100 is moving. FIG. 19 is a partial cross-section showing the components of the adjustable singulator 430. Singulator 430 comprises singulator plate 434 with an angular edge 436. Singulator 430 is channel-shaped and thus has a leg 440 in addition to singulator plate 434, which may be referred to as a leg 434, and connecting strap 441. Angular edge 436 is defined on singulator plate 434. Singulator 430 is mounted to a mounting plate 442 and specifically is mounted to a flange 444 that extends generally perpendicularly from mounting plate 442 that is attached to divider plate 88. Singulator 430 is attached with a nut 446 and pin 447. Singulator 430 will pivot about pin 447, so that edge 436 of singulator plate 434 will move to the left and the right as seen in FIG. 19 which may be referred to as lateral movement.

An adjustment rod 448 with an adjustment knob 450 thereon extends from the right side 58 of frame 35 through slide 374, and engages an inner surface 451 of connecting strap 441. A spring rod 452 is attached to a threaded nut 453 at left side 56 of frame 35. A spring 454 having first end 456 and second end 458 is disposed about spring rod 448. Spring rod 452 has end 459 that extends through connecting strap 441. First end 456 of spring 454 engages connecting strap 441 of singulator 430. The second end 458 of spring 454 is held in place by a lock ring 460 that is attached for movement with rod 452. Adjustment rod 448 is threaded through slide 373, so that rotation of adjustment rod 448 may push connecting strap 441 to move singulator plate 434 to the left, or out of slot 384 in nut pocket segment 376. Rotation of adjustment rod 448 in the opposite direction will allow spring 454 to push singulator plate 434 further into slot 384. Singulator 430 will pivot about pin 447 when adjustment rod 448 is rotated to move singulator 430. Singulator plate 434 may be adjusted while apparatus 10 is operating and endless conveyor 100 is moving. The position of singulator plate 434 is adjusted in slots 386 so that nuts 83 in nut pockets 366 are moved to the right, to insure that only one nut is resting in the nut pocket 366.

The operation of nut-cracking apparatus 10 may be described as follows. Air will be supplied by an air compressor of a kind known in the art (not shown). Air will be directed through a filter and then to a manifold (not shown) and ultimately to regulators represented by knobs on the outside of frame 35. Nut-cracking apparatus 10 thus has a feed regulator and associated knob 460, a stress regulator and associated knob 462, a crack regulator and associated knob 464, a release regulator and associated knob 466 and a reset regulator and associate knob 468. Crack air and feed air will pass through a lubricator while stress, release and reset air will pass directly into fittings 116 on spacer plate 110. Thus, air is supplied through feed hose 119, stress hose 121, crack hose 123, release hose 125 and reset hose 127 to fittings 116 at feed, stress, crack, release and reset openings 118, 120, 122, 124 and 126, respectively. Power is supplied to motor 76 which rotates sprocket 78. Chain 80 is disposed about rear sprocket 78 and forward sprocket 294 so that forward sprocket 294 will rotate shaft 74 and turret 70 will rotate at the desired speed. Chain sprocket 298 will rotate which causes endless conveyor 100 to move. Nuts 83 will move from first hopper portion 84 through opening 90 into second hopper portion 86 where nuts 83 will be picked up and carried by split nut pockets 366. Deflectors 402 and 404 will deflect excess nuts in the nut pockets 366 to prevent stacking of nuts 83. Adjustable singulator plate 434 extends through slot 432 in divider plate 88 so that as endless conveyor 100 moves nuts 83 toward delivery point 101, the nuts are urged to the right to laterally position the nut 83 in the nut pocket 366 and to prevent nuts 83 from being positioned side by side in the nut pocket 366. Thus, singulator plate 434 may be adjusted by rotating adjustment handle 450 as apparatus 10 is operating and endless conveyor 100 is moving.

Each nut 83 will be engaged by a nut-cracking unit 72 at delivery point 101 which may be approximately between 27 and 30 degrees counterclockwise of the vertical as shown in FIG. 4. Nut 83 is engaged in the embodiment shown after endless conveyor 100 has initially engaged nut chain sprocket 298 and thus after the split nut pocket 366 has begun to split or separate. Air is supplied into feed opening 118 through feed hose 119 and travels through the openings as described herein into the feed/stress air tube 350. As described herein, feed/stress tubes 350 are connected to fittings 244 which receive air through openings 242 in rotatable valve plate 200. The air is supplied to fitting 316 at left end 320 of air cylinder 304. The air moves piston 306 and piston rod extension 324 so that anvil 326 will engage the nut 83 and push the nut against a crack die 268 so that the nut is held therebetween. As the turret rotates, stress air is applied through stress hoses 121 into stress opening 120 and through feed/stress hose 350 so that the nut is held tightly between crack die 268 and anvil 326. Air is supplied through the stress openings as described herein and is applied approximately between 35 degrees and 37 degrees, and preferably approximately 36 degrees clockwise from vertical as viewed in FIG. 8. As turret 70 continues to rotate, crack air is supplied from crack opening 122 through crack openings as described herein so that air is applied to shuttle pipe 212 through the end 214 thereof which cause the shuttle 246 to move toward end 216 thereof to impact crack die 268 thus causing nut 83 to crack. Air in front of crack die 268 may pass into a corresponding reset pipe 228 through groove 261 and will pass out end 230 of reset pipe 228 and into the cavity 141. The cavity simply provides a location for the air in front of crack die 268 to dissipate. Cracking occurs approximately between 50 and 52 degrees and more preferably approximately 50.5 degrees clockwise from the vertical as shown in FIG. 8.

Continued rotation of the turret results in release air being supplied through release opening 124 which passes through the release openings as described herein into release air tube 348. Each release air tube 348 is connected to a fitting 240 at opening 238 in rotatable valve plate 200 and fitting 318 at second end 322 of air cylinder 304. Release air pushes piston rod 308 to the left so that it is in a position to receive feed air again to engage another nut 83 as the turret 70 rotates so that nut-cracking units 72 will be rotated to delivery point 101. Release air is supplied at approximately between 99 and 101 degrees and more preferably approximately 100 degrees clockwise of the vertical as shown in FIG. 8. Continued rotation results in the application of reset air through fitting 116 and reset opening 124. The reset air is applied as described herein and passes from end 230 to end 232 of reset pipe 228 through groove 261 in tube 216 of shuttle pipe 212 so that shuttle 246 therein is forced toward end 214 and is in position for crack air to be applied thereto. Reset air is applied between approximately 148 degrees and 150 degrees clockwise from vertical as shown in FIG. 8, and more preferably approximately 149.3 degrees. The air pressure for the feed, stress, crack, release and reset functions will vary depending upon the variety of nut and moisture content. However, starting pressures may be for example 15 to 20 psi for feed pressure, 15 to 25 psi for stress pressure, 15-30 psi for crack pressure, approximately 35 psi for release pressure and 7 to 12 psi for reset pressure. The explanation herein has been given with respect to one nut-cracking unit 72 and as is apparent from the drawings applies to each nut-cracking unit 72.

Ribs 52 on lid 40 along with crack die holder 262 and cylinder rod bushing plate 296 define crack containment space or fragment containment space 64 so that as each nut is cracked, shell fragments are prevented from spraying. The cracked nut and fragments therein are dropped into a discharge chute 472 which is mounted beneath frame 35. A pair of ribs 474 may be attached to the forward end 62 of frame 35 and have an edge 476 so that all fragments and cracked nuts are delivered between the ribs into chute 472 which discharges at the rear 60 of frame 35. Because endless conveyor 100 is comprised of split nut pockets 366, nuts are cracked in a more effective manner since each nut pocket 366 is in a fully open or fully separated position when the nut 83 is cracked. Thus, the nut 83 is not confined in any way on any side thereof, and shell fragments have ample space in which to expand and more complete cracking is achieved.

Further, because of the unique nut pocket configuration a more compact apparatus is achievable. For example, nut-cracking apparatus 10 of the current invention can be operated at a speed such that approximately 500 nut pockets per minute are delivered to pickup point 101, and thus, if each nut pocket carries a nut 83, 500 nuts per minute may be cracked. The distance between nut pocket centers 384 is approximately 1.5 inches, and the conveyor moves at slightly over 1 foot per second, approximately 1.04 feet/sec. to deliver nuts at that rate. This compares with prior art nut-cracking units which have a greater distance between nut pocket centers and which crack nuts at a rate of approximately 750 per minute with a chain speed of approximately 2.60 feet per second. Because a high quantity of nuts can be cracked at slower chain speeds, there is less wear on the motor and on the working parts of the apparatus 10. The unique configuration of the endless conveyor 101 likewise provides for a more compact nut cracker since the centers of the nut pockets are closer than in prior art configurations. The embodiment shown may have an overall height from the floor to the top of lid 40, when closed, of less than 60" and preferably less than approximately 52", and a height of less than 48 inches to the top of the hopper 82. The maximum width from the left side 25 to the right side 30 of apparatus 10 is preferably less than 36 inches, and more preferably less than 32 inches. The depth of apparatus 10 is preferably less than 48 inches, and more preferably less than 44 inches. The legs will vary in length, and may be for example between 20-30 inches in length. The frame may therefore be between approximately 22 to 26 inches in height.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A nut-cracking apparatus for cracking nuts comprising:
    an endless conveyor comprising a plurality of adjacent nut pocket segments, the nut pocket segments defining a plurality of nut pockets for delivering nuts to a pickup point, each nut pocket comprising first and second nut pocket portions, wherein the first portion of a nut pocket is defined on one nut pocket segment, and the second portion of the nut pocket is defined on an adjacent one of the nut pocket segments, and wherein each nut pocket segment defines a first portion of one of said nut pockets and a second portion of another of said nut pockets, each of the first and second nut pocket portions comprising a curved surface; and
    a plurality of nut cracking units for engaging nuts at the pickup point and removing the nuts from the nut pockets.

2. The nut cracking apparatus of claim 1, the first and second nut pocket portions of each nut pocket being movable relative to each other.

3. The nut cracking apparatus of claim 1, the endless conveyor comprising:
    a drive chain with the plurality of nut pocket segments connected thereto, each nut pocket segment being movable relative to an adjacent nut pocket segment.

4. The nut cracking apparatus of claim 3, wherein the drive chain comprises a plurality of links pivotably connected to one another, and wherein each link has a nut pocket segment connected thereto.

5. The nut cracking apparatus of claim 1, wherein each nut pocket moves between a closed, carrying position, and an open position, wherein in the open position the first and second portions of the nut pocket are rotated outwardly from the carrying position.

6. The nut cracking apparatus of claim 1, further comprising a turret rotatably mounted to the frame, the turret comprising a plurality of the nut cracking units.

7. The nut cracking apparatus of claim 1, wherein the nuts are cracked by the nut cracking units after removal from the nut pockets.

8. A nut cracking apparatus comprising:
    a frame;
    a rotatable turret comprising a plurality of nut cracking units mounted to the frame; and
    an endless conveyor comprising a plurality of nut pockets for delivering nuts to a pickup point, each nut pocket being defined by adjacent nut pocket segments wherein each nut pocket segment has a curved surface on a forward side thereof to define a first portion of one of the plurality of nut pockets and a curved surface on a rear side thereof to define a second portion of another of said nut pockets, each nut pocket being adapted to deliver a single nut to the pickup point at which the nut in the nut pocket is engaged by one of the plurality of nut cracking units, wherein the nut is held by the nut cracking unit and moved away from the nut pocket prior to cracking by the nut cracking unit, and wherein each nut pocket opens from a nut carrying position to an open position.

9. The nut cracking apparatus of claim 8 wherein the endless conveyor comprises:
    a drive chain mounted to a rear sprocket and a forward sprocket; and
    the plurality of nut pockets being carried by the drive chain.

10. The nut cracking apparatus of claim 9, wherein each nut pocket segment is pivotably connected to a link in the drive chain.

11. The nut cracking apparatus of claim 8 wherein the apparatus will crack nuts at a rate of at least 500 per minute at a conveyor speed of less than 1.1 feet per second.

12. The nut cracking apparatus of claim 8 further comprising a singulator plate for urging nuts in the nut pockets laterally to remove nuts in excess of one nut per nut pocket.

13. The nut cracking apparatus of claim 12, wherein the singulator plate extends into singulator slots defined in the nut pocket segments.

14. The nut cracking apparatus of claim 13, wherein the distance the singulator plate extends into the singulator slots may be adjusted during operation of the nut cracking apparatus.

15. The nut cracking apparatus of claim 8 further comprising an adjustable deflector for removing excess nuts stacked upon nuts in the nut pockets.

16. The nut cracking apparatus of claim 15, comprising a plurality of adjustable deflectors for deflecting excess nuts carried by the endless conveyor.

17. The nut cracking apparatus of claim 8, wherein the first and second nut pocket portions of each nut pocket are movable relative to each other.

18. A nut cracking apparatus comprising:
    a frame;
    a rotatable turret comprising a plurality of nut cracking units mounted in the frame;
    a conveyor for delivering nuts from a hopper to a delivery point wherein nuts are engaged by nut cracking units, wherein the conveyor comprises a plurality of nut pockets, each nut pocket being defined by first and second nut pocket portions, the first and second nut pocket portions of each nut pocket being movable relative to each other and the first and second portions of each nut pocket comprising curved surfaces.

19. The nut cracking apparatus of claim 18, wherein a length between centers of nut pockets is less than about 1.60 inches.

20. The nut cracking apparatus of claim 19, wherein the length between nut pocket centers is about 1.50 inches.

21. The nut cracking apparatus of claim 18, the conveyor comprising a drive chain with a plurality of connected links and a plurality of nut pocket segments, wherein each nut pocket segment is pivotably connected to a single link in the drive chain.

22. The nut cracking apparatus of claim 21, wherein each nut pocket segment defines a first portion of one nut pocket and a second portion of an adjacent nut pocket.

23. The nut cracking apparatus of claim 18, wherein the conveyor comprises a plurality of nut pocket segments, each nut pocket segment comprising the first portion of one nut pocket and the second portion of an adjacent nut pocket.

24. A nut cracking apparatus comprising:

a frame defining a hopper for holding nuts;

a rotatable turret comprising a plurality of nut cracking units mounted in the frame;

a conveyor comprising a plurality of nut pockets for delivering nuts to the pick up point where nuts are engaged by nut cracking units;

a singulator plate for positioning nuts laterally in the nut pockets, each nut pocket comprising a singulator slot for receiving the singulator, wherein the distance the singulator plate extends into the singulator slot may be adjusted as the turret rotates and the conveyor delivers nuts to the pickup point; and an adjustment rod associated with the singulator plate, wherein rotation of the adjustment rod changes the distance the singulator plate extends into the singulator slot.

25. The nut cracking apparatus of claim 24, wherein the nut pockets comprise first and second separable nut pocket portions.

26. The nut cracking apparatus of claim 24, wherein the adjustment rod extends from a first end at an exterior of the frame through the frame.

27. The nut cracking apparatus of claim 26, further comprising an adjustment handle at the first end of the adjustment rod for rotating the adjustment rod.

28. The nut cracking apparatus of claim 24, the conveyor comprising a plurality of nut pocket segments, each nut pocket segment being movable relative to adjacent nut pocket segments.

29. The nut cracking apparatus of claim 28, each nut pocket comprising first and second nut pocket portions, wherein each nut pocket segment defines a first portion of one of the nut pockets and a second portion of an adjacent nut pocket.

* * * * *

UNITED STATES PATENT AND TRADEMARK OFFICE
CERTIFICATE OF CORRECTION

PATENT NO. : 7,673,561 B1  Page 1 of 1
APPLICATION NO. : 11/025445
DATED : March 9, 2010
INVENTOR(S) : Basil W. Savage, Steven W. Savage and Randal D. Ingle It is certified that error appears in the above-identified patent and that said Letters Patent is hereby corrected as shown below:

Title Page, Item [73] Assignee:
Remove: "Savaga Equipment Incorporated" and insert --Savage Equipment Incorporated--.

Signed and Sealed this

Twenty-fifth Day of May, 2010

David J. Kappos
*Director of the United States Patent and Trademark Office*